United States Patent [19]
Nishio

[11] 4,413,352
[45] Nov. 1, 1983

[54] X-RAY STEREOSCOPIC CINEMATOGRAPHY APPARATUS

[75] Inventor: Kohsaku Nishio, Ootahara, Japan

[73] Assignee: Tokyo Shibaura Denki Kabushiki Kaisha, Japan

[21] Appl. No.: 316,674

[22] Filed: Oct. 30, 1981

[30] Foreign Application Priority Data

Oct. 30, 1980 [JP] Japan ............................ 55-152668

[51] Int. Cl.$^3$ .......................................... G03B 41/16
[52] U.S. Cl. ...................................... 378/42; 378/41
[58] Field of Search ................................. 378/41, 42

[56] References Cited

U.S. PATENT DOCUMENTS 3,432,658 3/1969 Quinn .................................... 378/41
4,287,420 9/1981 Yamamura ........................... 378/41
4,383,328 5/1983 Kurihara ............................. 378/42

Primary Examiner—Craig E. Church
Attorney, Agent, or Firm—Finnegan, Henderson, Farabow, Garrett & Dunner

[57] ABSTRACT

An X-ray stereoscopic cinematography apparatus including an X-ray tube having at least a pair of focal spots from which X-rays are irradiated independently at an object to produce an X-ray image of an object under study, means for converting the X-ray image to an optical image, an optical system device for distributing the optical image to first and second cinecameras. The optical system device includes a first half-mirror having a reflection rate of approximately fifty percent and a second half-mirror having a comparatively low transmission rate, the half-mirrors being separately positionable in a first position to reflect the optical image or a second position out of the light path of the optical image to distribute the optical image to the first and second cinecameras. A television camera is provided to accept the optical image delivered through the optical system device and to convert it to an electric signal. A mode setter enables the selection of one of a stereoscopic cinematography mode, a single cinematography mode, and a fluoroscopy mode.

7 Claims, 4 Drawing Figures

X-RAY STEREOSCOPIC CINEMATOGRAPHY APPARATUS

FIELD OF THE INVENTION

This invention relates to an X-ray stereoscopic cinematography apparatus and, more particularly to an X-ray stereoscopic cinematography apparatus having functions to carry out single source X-ray cinematography and X-ray fluoroscopy.

BACKGROUND OF THE INVENTION

In the field of X-ray examination there is oftentimes a great need to view an object such as an organ of a patient as a three-dimensional image. Such need is particularly acute in angiography. In the past, only single direction radiography has been available as an examination tool in the treatment of congenital heart disease, valvular heart disease, hepatic artery disease, or the like. In the treatment of all of these diseases cardiovascular angiography is employed. However, three-dimensional organs and tissues can be observed only in a single plane when single direction radiography is used. It is extremely difficult to view a single direction radiographic image as a stereoscopic image.

Dual direction radiography has been used in the past to observe the cardiovascular system. Since the two resultant images, however, are both individual planar images differing only in radiographic direction, stereo-viewing of dual direction radiographic images has not proved satisfactory.

Also, in cardiovascular angiography, X-ray fluoroscopy has been performed by injecting a contrast medium and then filming fluoroscopic images with a cinecamera. Since conventional fluoroscopy systems are constructed to use one individual X-ray tube and one individual cinecamera for each direction of radiography, the resultant images in each direction are merely individual planar images even when two-directional radiography is employed. Because of the shortcomings of radiographic and fluoroscopic systems, it is difficult to observe the cardiovascular system precisely in a three-dimensional manner.

SUMMARY OF THE INVENTION

It is therefore an object of this invention to provide an X-ray stereoscopic cinematography apparatus to enable the viewing of three-dimensional X-ray cinematography images of an object.

It is a further object of this invention to provide an X-ray stereoscopic cinematography apparatus capable of performing single X-ray cinematography.

It is yet another object of this invention to provide an X-ray stereoscopic cinematography apparatus capable of performing X-ray fluoroscopy.

It is yet a further object of this invention to provide an X-ray stereoscopic cinematography apparatus capable of performing both single X-ray cinematography and X-ray fluoroscopy.

Briefly, these and other objects are achieved in accordance with a first aspect of the invention by an X-ray cinematography apparatus capable of displaying an object in any of a stereoscopic X-ray cinematography, a single X-ray cinematography, and a fluroscopy mode, comprising an X-ray tube having at least a pair of focal spots from which X-ray beams are independently irradiated to scan an object under observation and to produce an X-ray image thereof, means for converting the X-ray image to a corresponding optical image, a first cinecamera, a second cinecamera, an optical image distributor for selectively distributing the optical image between the first cinecamera and the second cinecamera, the optical image distributor including a first half-mirror having a reflection rate of substantially fifty percent and being positionable in a first position to reflect the optical image to the first cinecamera and a second position removed from the path of the optical image and a second half-mirror having a comparatively low transmission rate and being positionable in a first position to reflect the optical image to the second cinecamera and a second position removed from the path of the optical image, the first cinecamera for photographing the optical image reflected thereto by the first half-mirror and the second cinecamera for photographing the optical image reflected thereto by the second half-mirror, a television camera for receiving the optical image and for converting the received optical image to corresponding electric signals, a mode setter for selecting one of a stereoscopic cinematography mode, a single cinematography mode, and a fluoroscopy mode, a radiographic control device for positioning the first half-mirror and the second half-mirror between the first and second positions, for controlling filming by the first and second cinecameras, and for generating X-ray exposure switching signals to synthronize the shutter movements of the first and second cinecameras in accordance with the mode selected by the mode setter, and an X-ray switch controller for performing on-off control for X-rays irradiated from the focal spots of the X-ray tube.

Preferably, the radiographic control device controls the degree of opening of diaphragms associated with the second cinecamera and the television camera according to changes in the intensity of light incident thereon due to the positioning of said first and second half-mirrors into the first and second positions.

DESCRIPTION OF THE PREFERRED EMBODIMENT

Figure 1:
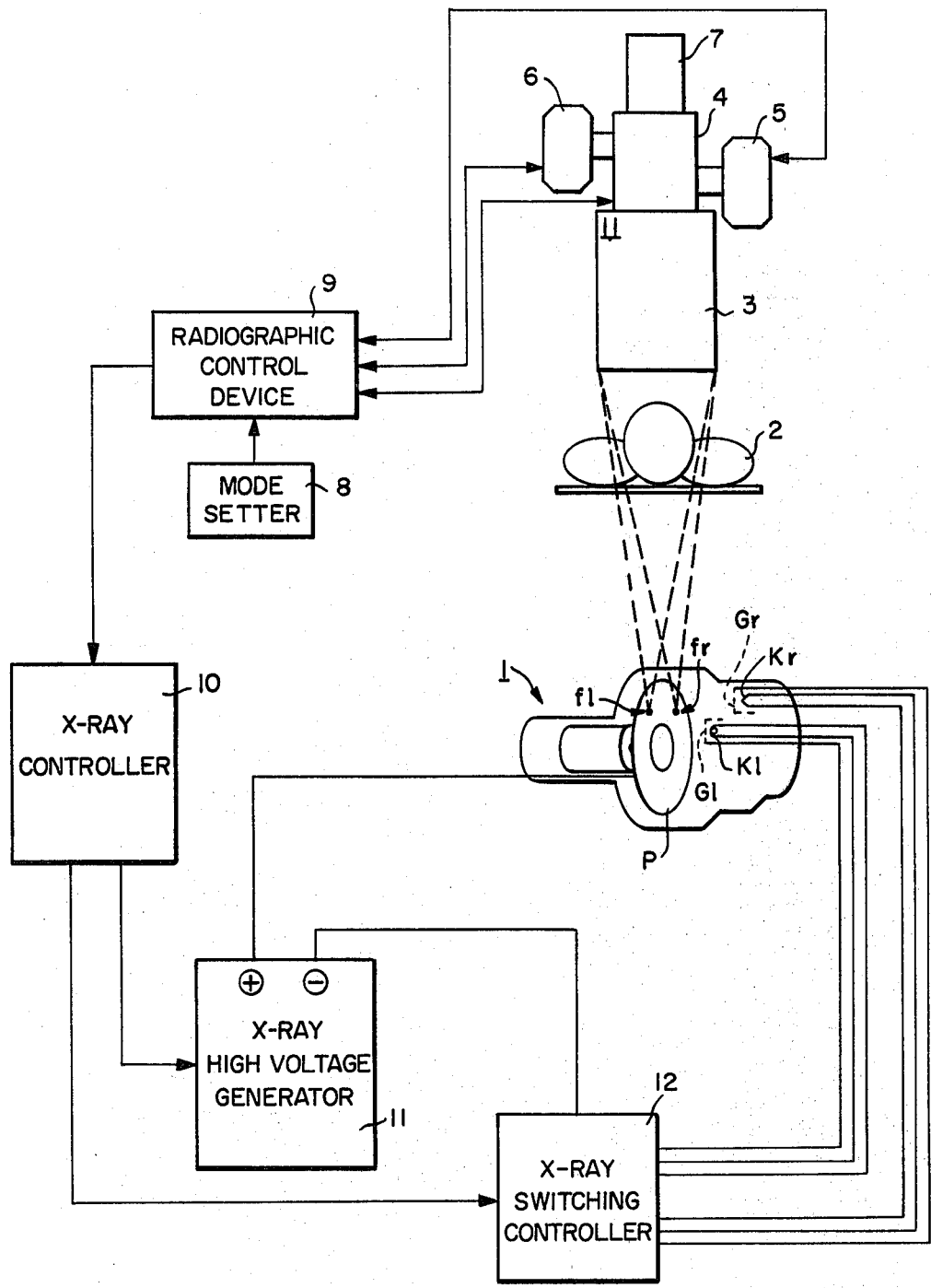
FIG. 1 is a schematic block diagram illustrating an embodiment of this invention.

Referring now to FIG. 1, an X-ray tube 1 for stereoscopic radiography has a conic trapezoidal-shaped rotating anode P, and two cathodes Kr and Kl spaced apart from one another by a distance corresponding the average distance between a person's pupils and facing the oblique part of anode P. The suffixes r and l to the reference numerals are used herein to refer to the right and left eyes, respectively.

A pair of grids Gr and Gl are interposed between the cathodes Kr and Kl and the rotating anode P for X-ray exposure control. The grids Gr and Gl are electrically conductive and the potentials applied to the grids Gr and Gl are cyclically alternated to permit X-rays to be emitted from a pair of focal spots fr and fl on the anode P of the X-ray tube 1. Heat electrons are alternately emitted from the cathodes Kr and Kl for the right and left eyes. The heat electrons impinge upon the oblique plane of the anode P at the focal spots fr and fl to cause a pair of X-ray beams to be radiated. Thus, the resultant pair of X-ray beams are spaced apart by a distance equal to the average distance between the pupils of the eyes and are alternately generated. A pair of examples of the above-described X-ray tube 1 is taught, for example, in U.S. Pat. No. 4,287,420.

An object 2 to be studied, such as a patient, is positioned between the X-ray tube 1 and an image intensifier 3. The image intensifier 3 accepts on its input face the X-ray beams emanating from the X-ray tube 1 after passing through the object 2. The X-ray beams passing through the object 2 form an X-ray image thereof. The intensifier 3 converts the X-ray image to a corresponding optical image. An optical system device 4 connected to the output of the intensifier 3 distributes the optical image produced by the intensifier 3.

Cinecameras 5 and 6 are attached to the optical system 4 to photograph the optical images distributed and directed thereto through the optical system 4 from the output of the intensifier 3. The cinecameras 5 and 6 are driven so as not to superimpose their shutter open times. That is, each of the cinecameras 5 and 6 includes a shutter (not shown) which, for example, comprises a rotating disc having a window in a portion thereof. The speed of the film is coordinated with the rotation rate of the shutter so that a single image per film frame is photographed through the window for each rotation of the shutter.

The shutters of the cinecameras 5 and 6 are rotated 180° out of phase so that images are alternately photographed by the cinecameras 5 and 6 to perform stereoscopic radiography. An example of a suitable cinecamera is the ARRITECHNO 35 manufactured by Arnold & Richter KG.

The cinecameras 5 and 6 also include detectors (not shown) for issuing shutter position signals indicating whether the shutter is in a first position, for example open, or a second position, for example closed. The shutter position signals are supplied to a radiographic control device as explained below.

A television camera 7 is provided for converting the optical image from the intensifier 3 to an electric image signal and for delivering the resultant signal to a television monitor (not shown) for display.

Figure 2:
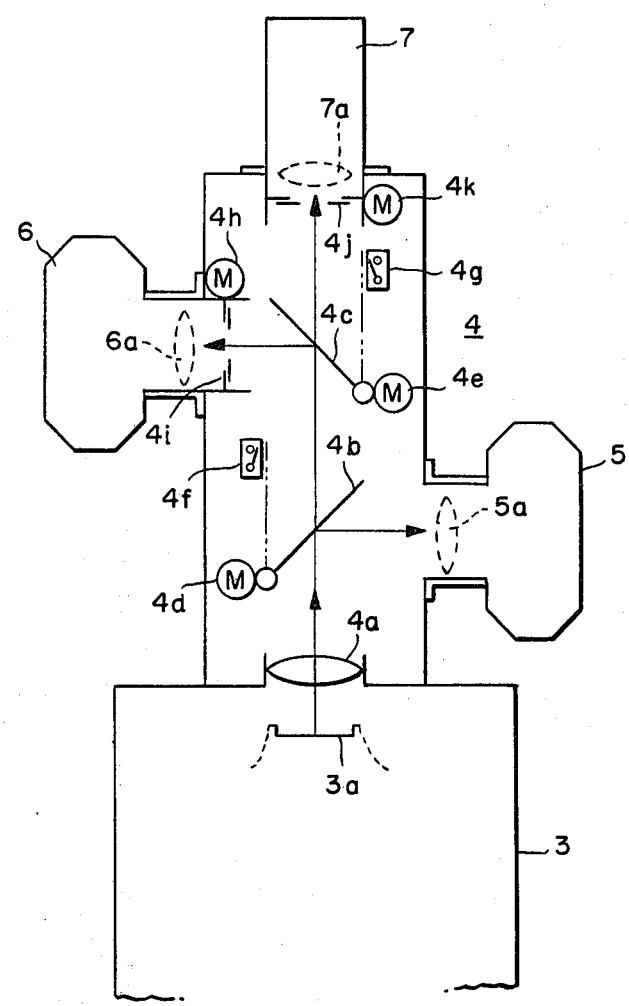
FIG. 2 is a sectional view of the optical system device of this invention.

FIG. 2 illustrates the optical system device 4 and the optical system peripherals, i.e., cinecameras 5, 6, and television camera 7. The optical system device 4 comprises a dark box and a television camera 7 attached to the optical system 4 so that the optical axis of the camera 7 is aligned with the optical axis of a lens 4a positioned in front of the output face 3a of the intensifier 3. The television camera 7 includes a lens 7a.

Cinecameras 5 and 6 are attached to the optical system 4 at different heights with respect to each other. Also, the optical axis of each of the cinecameras 5, 6 intersects the optical axis of the lens 4a at an angle of 90°.

A pair of half-mirrors 4b and 4c are placed in the optical system 4 at the optical axis positions of the lens 4a and corresponding to the optical axes of the cinecameras 5 and 6. The half-mirrors 4b and 4c distribute the optical images produced by the lens 4a and the intensifier 3 to the cinecameras 5, 6, respectively.

The half-mirror 4b nearest the lens 4a has a reflection rate of fifty percent and a transmission rate of fifty percent. The half-mirror 4c nearest the camera 7 has a reflection rate of ninety percent and a transmission rate of ten percent. The half-mirrors 4b and 4c are positionable into and out of the optical path of the image produced by the lens 4a. For example, the half-mirror 4b is positionable into a first position in the path of the optical image produced by the lens 4a, and a second position (shown in phantom) removed from the light path of the optical image from the lens 4a. The half-mirror 4c is similarly positionable into a first position (image reflecting) and a second position (non-reflecting shown in phantom). Position detectors 4f and 4g are associated with the half-mirrors 4b and 4c, respectively, for individually detecting whether the half-mirrors 4b and 4c are in the second or non-reflecting positions.

The optical system device further includes an optical diaphragm 4i having an opening size controlled by a motor 4h for controlling the amount of light incident upon a lens 6a positioned between the diaphragm 4i and the cinecamera 6. The diaphragm 4i modulates the intensity of the light emitted to the cinecamera 6. For example, since the intensity of the light incident upon the cinecamera 6 is increased when the half-mirror 4b is positioned in its second position, i.e., out of the path of the optical image from the lens 4a, the diaphragm 4i is closed by motor 4h to diminish the intensity of the light incident upon lens 6a. On the other hand, since the light intensity to the cinecamera 6 is decreased when the half-mirror is positioned in its first position (reflecting), the diaphragm 4i is opened by the motor 4h to increase the intensity of the light incident upon lens 6a. Alternatively, the optical diagphragm can be included within the cinecamera 6 and may be utilized if such a diaphragm can be made appropriately responsive to external automatic control signals corresponding to the positions of half-mirrors 4b and 4c.

An optical diaphragm 4j is provided for adjusting the intensity of light provided to the television camera 7 which varies in accordance with the positioning of the half-mirrors 4b and 4c into the first and second positions. The diaphragm 4j is activated by a motor 4k. The cinecamera 5 includes a lens 5a located between the half-mirror 4b and the cinecamera 5.

Referring again to FIG. 1, a mode setter 8 selectively sets the system into and out of various operating modes such as fluoroscopy, and stereoscopic or single source cinematography. A radiographic control device 9 is provided to drive each of the motors 4d, 4e, 4h, and 4k according to the output signals produced by the position detectors 4f and 4g so as to be in the proper positions to carry out the mode selected by the mode setter 8. The radiographic control device 9 also operates to control the drive of cinecameras 5 and 6 in the stereoscopic mode and the drive of only cinecamera 6 whenever the radiographic mode is selected and to produce shutter motion detecting outputs for the cinecameras 5 and 6.

An X-ray controller 10 generates the voltage and current settings for the X-ray tube 1 corresponding to fluoroscopic or radiographic operation of the system whenever the fluoroscopy or the radiography modes are selected by the mode setter 8. Furthermore, the X-ray controller 10 generates an X-ray exposure switching control output signal for the right cathode Kr of the X-ray tube 1 when the position sensor 4f indicates that the half-mirror 4b is in the first or reflecting position and an X-ray exposure switching control output signal for left cathode Kl of the X-ray tube 1 when the position sensor 4g indicates that the half-mirror 4c is in the first or reflecting position.

An X-ray high voltage generator 11 issues high voltage pulses responsive to the voltage and current settings generated by the X-ray controller 10 to permit the X-ray tube 1 to generate radiation pulses. An X-ray tube switching controller 12 is coupled to the X-ray high voltage generator 11 and the X-ray controller 10. The X-ray switching controller controls the potential applied to the grids Gr and Gl and the cathodes Kr and Kl to perform on-off control of the X-ray beams generated by the X-ray tube 1.

Figure 3:
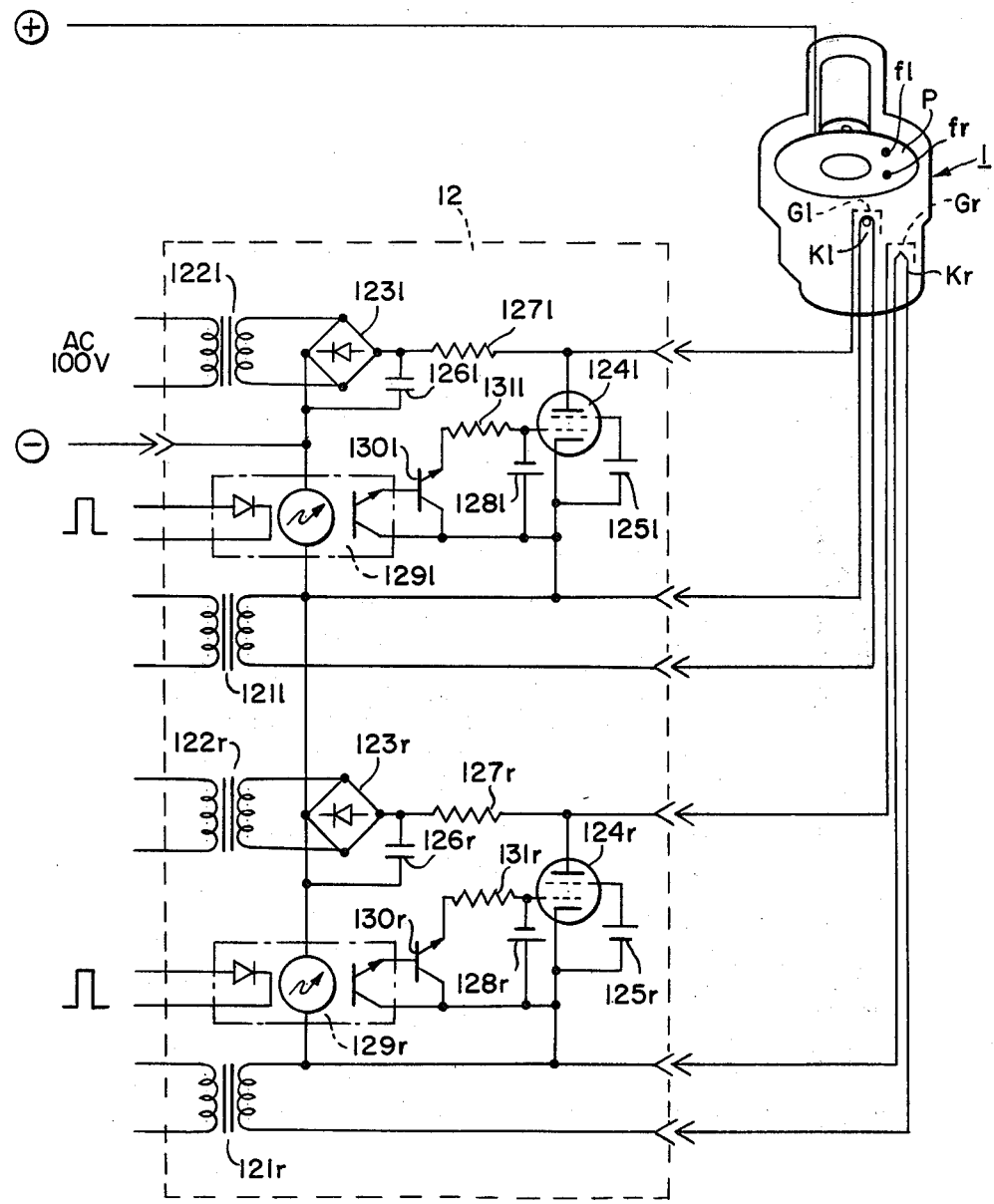
FIG. 3 is a detailed circuit diagram illustrating the X-ray tube switching controller of FIG. 1.

The X-ray tube switching controller 12 is shown in detail in FIG. 3 wherein the symbols + and − designate input terminals for receiving the positive and negative polarity high voltage pulses generated by the X-ray high voltage generator 11. The X-ray switching controller 12 includes two separate but similar control circuits singly associated with the cathodes Kr and Kl utilized to generate the two focal spots fr and fl on the anode P of the X-ray tube 1. Since the two control circuits have the same construction, only one of the circuits will be explained in detail although both circuits are illustrated in FIG. 3. The elements included in the two circuits are readily identifiable by the r and l subscripts used in FIG. 3. For purposes of description and in view of the similar operation of the two circuits, the subscripts will be dropped in the following discussion of FIG. 3.

In FIG. 3, a filament heating transformer 121 receives the output of the X-ray high voltage generator 11 to generate the heating voltage to be applied to the cathodes Kl or Kr of the X-ray tube 1 to generate the heat electrons.

A transformer 122 for producing the grid potentials to control the electric gating grids Gl or Gr for the X-ray tube 1 is connected at one winding to a power supply source. The other winding is connected across a rectifying circuit 123 which completely rectifies the output of the transformer 122 to obtain a dc voltage of negative polarity. A tetrode 124 for the exposure switching control of the X-ray tube 1 is connected to the output of the rectifier 123 and between the corresponding gating grid and cathode of the X-ray tube 1. A power supply source 125 for applying a second gating grid potential is connected between the cathode and a second grid of the tetrode 124 and applies to the second grid of the tetrode 124 a positive potential to bring the internal resistance of the tetrode to an optimum value. A condenser 126 is connected between the output terminals of the rectifying circuit 123. A resistor 127 is connected between the rectifying circuit 123 and the corresponding grid of the X-ray tube 1. A potential source 128 is connected between the cathode and the first grid of the tetrode 124 to bias the first grid to a negative value.

A photocoupler 129 is provided and is activated by accepting the X-ray exposure control switching output signal from the X-ray controller 10. A switching transistor 130 is activated by the output of the photocoupler 129. The transistor 130 is connected at its emitter to the negative terminal of the potential source 128 through a resistor 131 and at its collector to the positive terminal of the potential source 128.

In the operation of the X-ray switching controller 12, the high voltage output signal from the X-ray high voltage generator 11 is applied between the anode and cathode of the X-ray tube 1 and is applied to the cathode, for example Kl, through the filament having transformer 121 to produce a filament heating voltage. The output of the transformer 122 is rectified by the rectifying circuit 123 and applied as a negative potential to the corresponding grid of the X-ray tube 1 through the resistance 127. Thus, an inverse bias is provided between the corresponding grid and the cathode associated therewith of the X-ray tube 1 by the output voltage of the rectifying circuit 123 so that the X-ray tube 1 is held in a cut-off state. The output voltage of the rectifying circuit 123 is also supplied to the tetrode 124 to inversely bias the tetrode 124 and place it in a normal cut-off state.

When the X-ray exposure switching control output signal of the X-ray controller 10 is applied to the photocoupler 129, the transistor 130 is switched on by the output of the photocoupler 129. Accordingly, a closed circuit is formed including the bias potential source 128, transistor 130, and resistance 131 to cause a voltage drop across the resistance 131 so that the inverse bias applied to the first grid of the tetrode 124 is removed. The tetrode 124 is thereby switched to the on state. Since current flows in a closed circuit including the resistance 127 and the tetrode 124, a voltage drop occurs across the resistance 127 and the inverse bias applied to the grid of the X-ray tube 1 is removed. As a result, heat electrons are emitted from the cathode of the X-ray tube 1 corresponding to the grid. When the heat electrons strike the anode P, a focal point is defined and X-rays are emitted from the X-ray tube 1.

When the X-ray exposure switching control output signal is removed, the photocoupler 129 no longer conducts so that the transistor 130 is turned off. This causes the first grid of the tetrode 124 to be reverse biased again and the current flow through the tetrode 124 is cut-off. Therefore, a reverse bias is also applied to the grid of the X-ray tube 1 and the flow of heat electrons from the X-ray tube 1 is also cut-off. The emission of X-rays immediately ceases.

It is possible to control the X-ray emissions to be separately associated with the right and left eyes by alternately causing the photocouplers 129r and 129l to be switched on or off by the X-ray exposure control switching output signal.

In the operation of the invention as illustrated in FIG. 1, the mode setter 8 is initially operated to select one of the stereoscopic cinematography, single cinematography, and fluoroscoic radiography modes.

By applying the proper control signal to the radiographic control device 9, the system operates in the stereoscopic cinematography mode and causes the position detectors 4f and 4g in the optical system 4 to issue signals indicating the current position of the half-mirrors 4b, 4c, respectively. The proper control signals are applied by the radiographic control device 9 to the motors 4d and 4e for the half-mirrors 4b and 4c to position the half-mirrors 4b and 4c into their first positions, that is within the optical path of the image from the lens 4a. An actuative output by the radiographic control device 9 also is applied to each of the motors 4h and 4k, respectively, to position the diaphragms 4i and 4j to their proper opening corresponding to the light incident upon lenses 6a and 7a, respectively. The degree of diaphragm opening is adjusted automatically to preset values corresponding to the selected mode in such a way that since the transmission rate of each of the half-mirrors 4b and 4c has been previously determined, the device opening of diaphragms 4i and 4j is previously set according to the transmission rates. Thus, the optical system device 4 is set in the proper state for stereoscopic cinematography.

Furthermore, the radiographic control device 9 controls the X-ray controller 10 so that the voltage and current signals corresponding to the selected radiographic condition are generated and supplied to the X-ray tube 1. Also, the radiographic control device 9 delivers a drive signal to the cinecameras 5 and 6 to actuate them.

Figure 4:
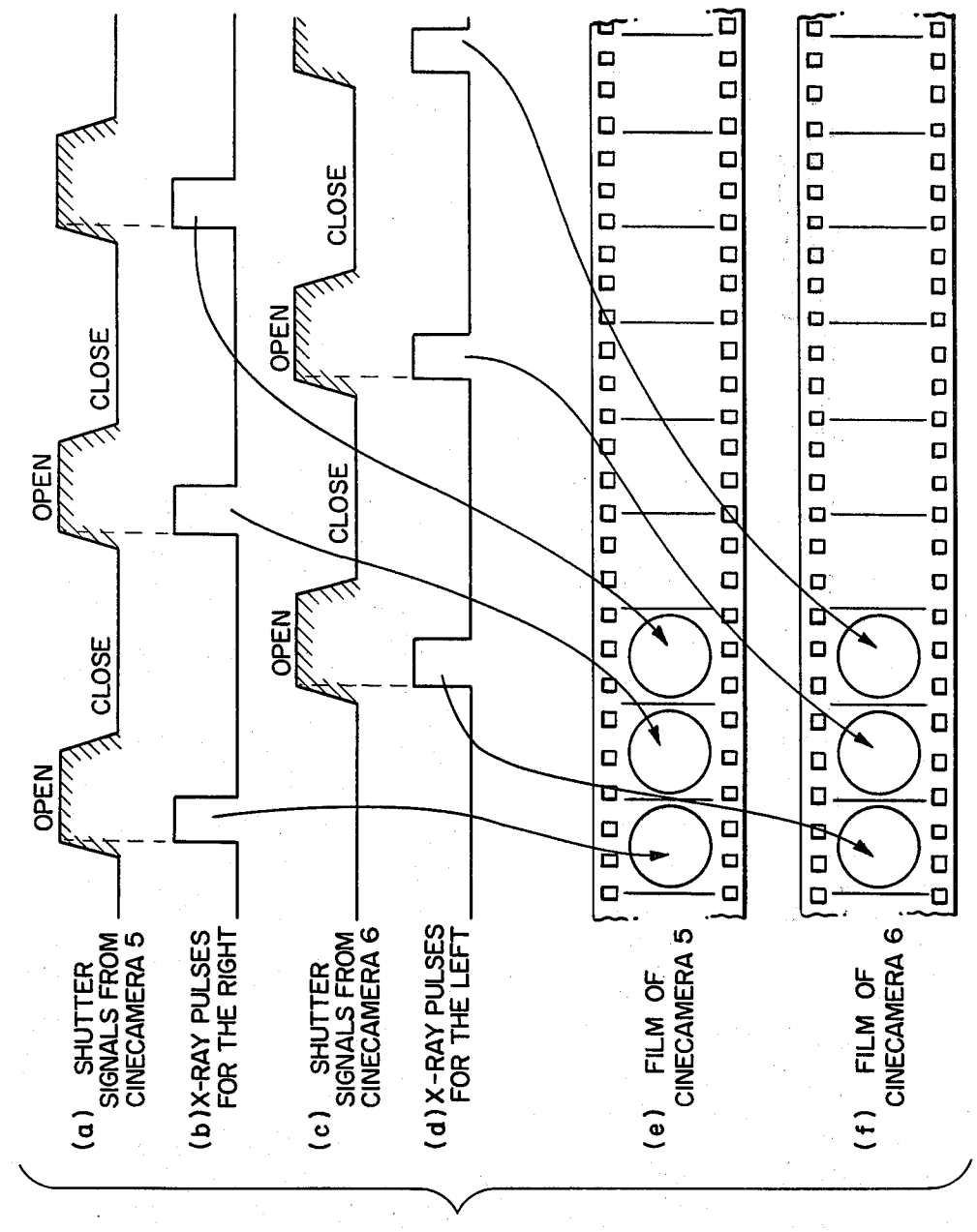
FIGS. 4(a) to (f) are timing diagrams for explaining the operational sequence of the invention.

As stated above, the shutters of the cinecameras 5 and 6 are shifted in phase with respect to each other so that the shutter openings are not superimposed during the stereoscopic cinematography mode as shown in FIGS. 4(a) and 4(c). Therefore, when the cinecamera 5 is in a shutter-open condition, the shutter of the cinecamera 6 is closed. Signals corresponding to the opening of the shutter of cinecamera 5 are issued from the shutter position detector (not shown) of cinecamera 5 as shown in FIG. 4(a). The radiographic control device 9 accepts the signals from the detector and generates the X-ray exposure control switching output signals shown in FIG. 4(b).

Assuming that the cinecamera 5 is used for the right eye and that the cinecamera 6 is to be associated with the left eye for the purposes of stereoscopic cinematography, the radiographic control device 9 delivers the X-ray exposure control switching output signal to the X-ray controller 10 for the right cathode Kr after receiving the shutter position detection signals from the cinecamera 5. Thereby, the X-ray controller 10 applies the X-ray exposure control switching output signals to the photocoupler 129r for the right cathode Kr controlled by the X-ray tube switching controller 12.

Thus, as previously described, the tetrode 124r for the right cathode Kr is switched on and heat electrons are emitted from the cathode Kr to the anode P of the X-ray tube 1 while the tube voltage is outputted by the X-ray high voltage generator 11. Consequently, X-rays are emitted from the focal point fr associated with the cathode Kr in the time sequence shown in FIG. 4(b).

The resultant X-ray image of the object impinges the input face of the image intensifier 3 which is positioned in line with the X-ray tube 1. The X-ray image is converted to a corresponding optical image and is directed to the optical system device 4. Fifty percent of that light amount is distributed by the half-mirror 4a for the cinecamera 5 when the half-mirror 4b is in the first position to photograph the right side pictures of the object 2 as shown in FIG. 4(e).

On the other hand, ninety percent of the remaining fifty percent of the image light intensity (forty-five percent of the initial intensity of the optical image) is distributed by the half-mirror 4c and is reflected to the cinecamera 6 when the half-mirror 4c is in the first (reflecting) position. However, if the shutter of the cinecamera 6 is closed, the cinecamera 6 will not record the optical image of the object. The remaining light, i.e., the five percent transmitted through both the half-mirrors 4b and 4c is incident upon the television camera 7 and displayed on a monitor (not shown).

Next, when the shutter (not shown) of the cinecamera 5 is closed and the shutter (not shown) of the cinecamera 6 is opened in the manner described above, an appropriate detective signal is delivered to the radiographic control device 9. The control device 9 generates the X-ray exposure control switching output signal for the left cathode Kl and supplies the signal to the X-ray controller 10. In response to that signal, the X-ray controller 10 generates a signal to activate the left side photocoupler 129l in the X-ray tube switching controller 12. Accordingly, the tetrode 124l is switched on and the reverse bias on the left grid G1 of the X-ray tube 1 is removed. Heat electrons are irradiated from the left side cathode Kl to the left focal spot fl on the anode P. Thus, X-rays are emitted from the left focal spot fl of the anode P, as shown in FIG. 4(d) at the time that the photocoupler 129l is switched on.

As a result, an X-ray image of the object is supplied to the input of the image intensifier 3 and is converted to a corresponding optical image to be provided by the optical system device 4.

In the optical system 4, when the half-mirrors 4b, 4c are each in the first position fifty percent of the image light intensity is distributed to the cinecamera 5 by the half-mirror 4b, forty-five percent of the intensity is distributed to the cinecamera 6 by the half-mirror 4c, and the remaining five percent is incident upon the television camera 7. At this time, since the shutter of the cinecamera 5 is closed, no pictures are taken thereby and only cinecamera 6 films the optical image of the object as shown in FIG. 4(f). The television camera 7 accepts the light incident thereon and displays it on a monitor (not shown) as a visual image.

As described above, when the shutter of the cinecamera 5 is open, the right side X-rays emitted from the X-ray tube 1 and the corresponding right side visual image is photographed by the cinecamera 5. When the shutter of cinecamera 6 is open, the left side X-rays emitted from the X-ray tube 1 and the corresponding left side visual image is photographed by the cinecamera 6. At no time are the shutters of both the cinecameras 5, 6 simultaneously open. Thereafter, until a radiography stop instruction is issued, the above-described operations are alternately repeated. Accordingly, the right side images for a three-dimensional display of the object are photographed by the cinecamera 5 and the left side images of the object are photographed by the cinecamera 6.

In the single cinematography mode, an actuative output is applied to the motor 4d from the radiographic control device 9 to shift the half-mirror 4b to the second position, i.e., out of the path of the optical image. The actuative output is applied simultaneously to the motors 4h and 4k to adjust the openings of the optical diaphragms 4i and 4j to a preset opening value corresponding to the light intensity of the optical image when the half-mirror 4b is in the second (non-reflecting) position. Subsequently, the cinecamera 6 is actuated by applying an actuative signal and the left side grid Kl of the X-ray tube 1 is switched on and off in synchronism with the position of the shutter of the cinecamera 6 to photograph the left side X-ray image. The resultant left side X-ray image is converted by the image intensifier 3 to an optical image. Ninety percent of the entire light intensity of the image is distributed to the cinecamera 6 by the half-mirror 4c and the remaining ten percent is distributed to the television camera 7 to display it on a monitor.

In the fluoroscopic mode, an actuative output is applied to the motors 4e and 4k from the radiographic control device 9 to shift the half-mirror 4c to the second (non-reflecting) position. The full output light intensity of the optical image generated by the intensifier 3 is received by the television camera 7 and the optical diaphragm 4j of the television camera 7 is adjusted simultaneously so as to accept the optimum incident light amount. Moreover, the X-ray controller 10 is set so that the proper tube voltage and current signals for the fluoroscopic mode of the X-ray tube 1 are generated to set the X-ray high voltage generator 11 into the fluoroscopic condition.

A signal for releasing the reverse bias on both the left and the right side grids Gl, Gr of the X-ray tube 1 is applied to the X-ray tube switching controller 12 through the X-ray controller 10 from the radiographic control device 9 and corresponding X-rays are emitted. The resultant X-ray image of the object is converted to an optical image by the intensifier 3 and then supplied to the television camera 7 for display on a monitor.

It will be apparent, to those skilled in the art, that modifications and variations can be made in the preferred embodiment disclosed herein without departing from the scope or the spirit of the invention. Thus, it is intended that those modifications and variations which come within the scope of the appended claims and their equivalents are included in the present invention.

What is claimed is:

1. An X-ray stereoscopic cinematography apparatus for selectively producing images of an object in a stereoscopic cinematography mode, a single cinematography mode, and a fluoroscopy mode by means of first and second cinecameras, each of the cinecameras including a rotatable shutter and an associated shutter position detector generating shutter position signals, the shutter of the first cinecamera being out of phase with the shutter of the second cinecameras, the apparatus comprising:

an X-ray tube having at least a pair of focal spots from which X-rays are independently irradiated through the object to create an X-ray image thereof;

means for converting said X-ray image to a corresponding optical image;

an optical system device for selectively distributing said optical image, said optical system device including a first half-mirror having a reflection rate of substantially one-half and being positionable in a first position to reflect said optical image to said first cinecamera and in a second position removed from the light path of said optical image and a second half-mirror having a comparatively low transmission rate and being positionable into a first position to reflect said optical image to said second cinecamera and a second position removed from the light path of the optical image;

a television camera for receiving the light intensity of said optical image not reflected by said first and second half-mirrors and for converting said received optical image to corresponding electric signals;

a mode setter for selecting one of said stereoscopic cinematography mode, single cinematography mode, and said fluoroscopy mode;

a radiographic control device for controlling the positioning of said first and second half-mirrors into and out of said first and second positions, for controlling photographing of said optical image by said first and second cinecameras, and for issuing X-ray exposure control switching signals synchronized to the positions of said shutters of said first and second cinecameras in accordance with said shutter position signals; and means for selectively performing on-off control of the X-rays irradiated from each of said focal spots of said X-ray tube responsive to said X-ray exposure control switching signals.

2. The X-ray stereoscopic cinematography apparatus of claim 1 further including:

a first cathode associated with one of said focal spots for irradiating said associated one focal spot with heat electrons to generate said X-rays;

a second cathode associated with the other of said focal spots for irradiating said associated other focal spot with heat electrons to generate said X-rays;

a first gating grid for selectively and electrically blocking said heat electrons from said first cathode from irradiating said associated other focal spot; and a second gating grid for selectively and electrically blocking said heat electrons from said second cathode from irradiating said associated other focal spot.

3. The X-ray stereoscopic cinematography apparatus of claim 2 wherein said selective performing means comprises an X-ray switching controller for applying selected electrical potentials to said first gating grid and said second gating grid to control the flow of said heat electrons from said first cathode and said second cathode to said first focal spot and said second focal spot, respectively.

4. The X-ray stereoscopic cinematography apparatus of claim 3 further including a first variable position diaphragm associated with said second cinecamera for controlling the intensity of the reflected light incident thereto and a second variable position diaphragm associated with said television camera to control the light incident thereto and means for controlling the position of said first and second diaphragms responsive to changes in the intensity of light incident upon second cinecamera and said television camera as a result of the positioning of said first and second half-mirrors in said first and second positions.

5. The X-ray stereoscopic cinematography apparatus of claim 4 wherein said X-ray switching controller comprises a pair of independent grid control circuits one of said grid control circuits being associated with said first gating grid and the other of said grid control circuits being associated with said second gating grid, said grid control circuits for supplying gating potentials to said associated gating grids in response to said X-ray exposure control switching signals to turn on and off radiation of said heat electrons from said pair of cathodes.

6. The X-ray stereoscopic cinematography apparatus of claim 5 wherein each of said grid control circuits includes a tetrode.

7. The X-ray stereoscopic cinematography apparatus of claim 1 wherein said converting means comprises an image intensifier.

* * * * *